(12) United States Patent
Barnett et al.

(10) Patent No.: US 7,637,718 B2
(45) Date of Patent: Dec. 29, 2009

(54) VANE ASSEMBLY WITH OUTER GROMMETS

(75) Inventors: Barry Barnett, Markham (CA); David Denis, Burlington (CA)

(73) Assignee: Pratt & Whitney Canada Corp., Longueuil (CA)

( * ) Notice: Subject to any disclaimer, the term of this patent is extended or adjusted under 35 U.S.C. 154(b) by 435 days.

(21) Appl. No.: 11/467,406

(22) Filed: Aug. 25, 2006

(65) Prior Publication Data

US 2007/0098557 A1    May 3, 2007

Related U.S. Application Data

(63) Continuation-in-part of application No. 11/223,129, filed on Sep. 12, 2005, now Pat. No. 7,530,782.

(51) Int. Cl.
*F01D 5/10* (2006.01)

(52) U.S. Cl. .................. 415/119; 415/189; 415/190; 415/191

(58) Field of Classification Search .............. 415/119, 415/189, 190, 191
See application file for complete search history.

(56) References Cited

U.S. PATENT DOCUMENTS

| | | | |
|---|---|---|---|
| 3,501,247 A | 3/1970 | Tournere | |
| 3,849,023 A | 11/1974 | Klompas | |
| 3,985,465 A | 10/1976 | Sheldon et al. | |
| 4,180,371 A | 12/1979 | Ivanko | |
| 4,305,696 A | 12/1981 | Pask | |
| 4,820,120 A | 4/1989 | Feuverier et al. | |
| 4,820,124 A | 4/1989 | Fried | |
| 4,907,944 A | 3/1990 | Kroger et al. | |
| 4,940,386 A | 7/1990 | Feuvrier et al. | |
| 5,074,752 A | 12/1991 | Murphy et al. | |
| 5,269,649 A | 12/1993 | Kiefer et al. | |
| 5,494,404 A | 2/1996 | Furseth et al. | |
| 5,547,342 A | 8/1996 | Furseth et al. | |
| 6,409,472 B1 | 6/2002 | McMahon | |
| 6,494,677 B1 | 12/2002 | Grady | |
| 6,543,995 B1 | 4/2003 | Honda et al. | |
| 6,619,917 B2 * | 9/2003 | Glover et al. | ............ 415/209.3 |
| 6,854,960 B2 | 2/2005 | Van Dine et al. | |
| 2005/0022501 A1 | 2/2005 | Eleftheriou et al. | |
| 2005/0109013 A1 | 5/2005 | Eleftheriou et al. | |

FOREIGN PATENT DOCUMENTS

CA    840224    4/1970

* cited by examiner

*Primary Examiner*—Igor Kershteyn
(74) *Attorney, Agent, or Firm*—Ogilvy Renault LLP

(57) ABSTRACT

A compressor vane having a root, a tip and an airfoil portion extending between the root and the tip is disclosed. A grommet is used in conjunction with the vane and has a lip sealingly surrounding a portion of the vane root and a circumferential portion protruding around a perimeter of the lip in engagement with a surface of a platform of the vane root. The circumferential portion has a profile similar to that of the airfoil portion.

16 Claims, 7 Drawing Sheets

VANE ASSEMBLY WITH OUTER GROMMETS

CROSS-REFERENCE TO RELATED APPLICATIONS

This is application is a continuation-in-part of U.S. patent application Ser. No. 11/223,129 filed Sep. 12, 2005 now U.S. Pat. No. 7,530,782, the specification of which is incorporated herein by reference.

TECHNICAL FIELD

The invention relates generally to gas turbine engines, and particularly to improved inlet guide vanes provided therein downstream of the engine fan or low pressure compressor.

BACKGROUND OF THE ART

Gas turbine engine vane assemblies are usually provided downstream of the engine fan and/or of a low pressure compressor to reduce the swirl in the air flow entering the high speed compressor. Such guide vane assemblies must be resistant to foreign object damage while having a minimal weight.

It is known to provide an outer shroud contained in the engine casing and having slots defined therethrough receiving the vane root therein to retain the vanes in place therewithin. In such a configuration, a grommet is usually inserted in the slots such as to surround a vane airfoil portion adjacent the root thereby isolating the vane from the shroud. However, during a foreign object damage event, a vane which is hit will move rearward as a result of the impact and the vane edge, which tends to be sharp, can cause cutting of the grommet and damage to other surrounding components. An adhesive such as a potting compound is sometimes used either in conjunction with or in replacement of the grommet, but the use of such an adhesive generally complicates the installation and replacement of vanes. In addition, the outer shroud used to retain the vanes in place increases the overall weight of the engine, as do the necessary connecting members to retain the vanes to this shroud, thus negatively affecting the engine's performance.

Accordingly, there is a need to provide an improved vane assembly.

SUMMARY OF THE INVENTION

It is therefore an object of this invention to provide an improved vane assembly.

In one aspect, the present invention provides, a vane assembly comprising a vane and a grommet engaged therewith, the vane having a root, a tip and an airfoil portion extending between the root and the tip, the root including an outer platform and a recessed portion adjacent thereto and interconnecting the airfoil portion and the platform, the recessed portion protruding beyond a profile of the airfoil a distance less than the outer platform, and the grommet having a lip sealingly surrounding said recessed portion of the root of the vane and a circumferential portion protruding around a perimeter of the lip in engagement with an inner surface of the platform, the circumferential portion having a profile corresponding to that of the airfoil portion.

In another aspect, the present invention provides a vane assembly for a gas turbine engine having an outer casing surrounding rotating blades of a rotor, the assembly comprising: a tubular wall portion of the outer casing located downstream of the blades, the wall portion having a series of circumferentially and regularly spaced apart openings defined therethrough; an inner shroud located inwardly of and concentric with the wall portion, the inner shroud and wall portion defining an annular flow path therebetween; a vane for each of the openings radially extending between the wall portion and the inner shroud, each vane having a tip engaged to the inner shroud, a vane root having an inner recessed portion thereof located inside a corresponding one of the openings, and an airfoil portion extending between the tip and the vane root; and a grommet at least partially disposed within each of the openings, each grommet having a circumferential portion and a lip, the circumferential portion extending around the corresponding one of the openings outside of the outer casing and having a slot defined therethrough aligned with the corresponding one of the openings, the lip extending from the circumferential portion around the slot and forming a seal between a perimeter of the corresponding one of the openings and the inner recessed portion of the vane root located therein.

In a further aspect, the present invention provides a rotor assembly for a gas turbine engine, the rotor assembly comprising: rotating blades; an outer casing surrounding the rotating blades, the outer casing having a series of circumferentially and regularly spaced apart openings defined therethrough downstream of the blades; an inner shroud located inwardly of and concentric with the outer casing downstream of the blades, the inner shroud and outer casing defining an annular flow path therebetween; a vane for each of the openings radially extending between the wall portion and the inner shroud, each vane having a tip engaged to the inner shroud, a vane root having an inner recessed portion thereof located inside a corresponding one of the openings, and an airfoil portion extending between the tip and the vane root; and a grommet at least partially disposed within each of the openings, each grommet having a circumferential portion and a lip, the circumferential portion extending around the corresponding one of the openings outside of the outer casing and having a slot defined therethrough aligned with the corresponding one of the openings, the lip extending from the circumferential portion around the slot and forming a seal between a perimeter of the corresponding one of the openings and the inner recessed portion of the vane root located therein.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
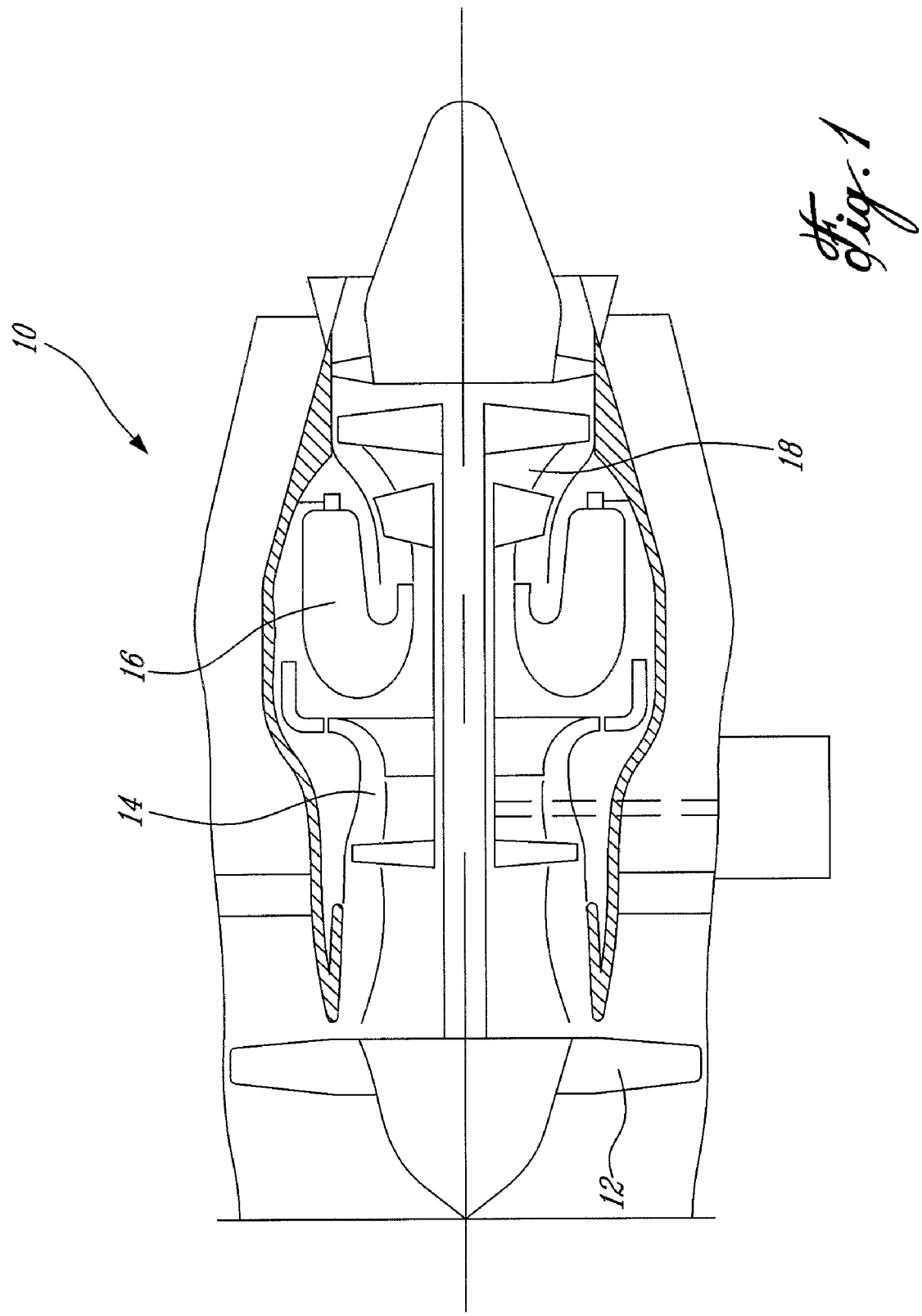
FIG. 1 is a side view of a gas turbine engine, in partial cross-section.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Figure 2:
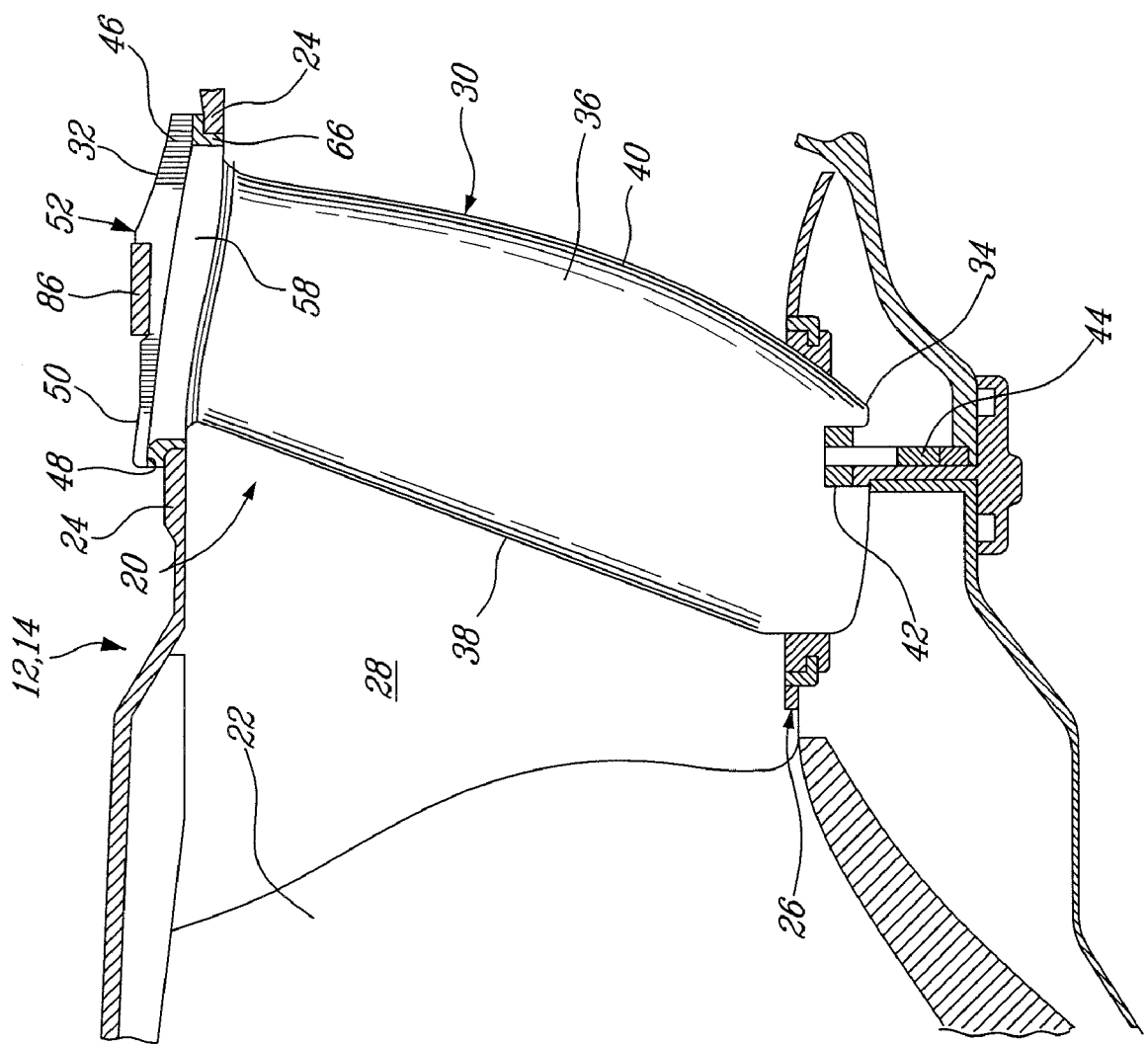
FIG. 2 is a side cross-sectional view of a guide vane assembly according to a particular embodiment of the present invention, within a gas turbine engine such as that shown in FIG. 1.

Referring to FIG. 2, a rotor assembly, which can be for example the fan 12 or a low pressure compressor of the compressor section 14 (both shown in FIG. 1), includes rotating blades 22 which are surrounded by an engine casing 24. The casing 24 extends downstream of the blades 22 to form part of a vane assembly 20. The vane assembly 20 comprises an inner shroud 26 concentric with the casing 24 and located downstream of the rotating blades 22, the inner shroud 26 and casing 24 defining an annular gas flow path 28 therebetween, and a plurality of vanes 30 extending radially between the outer casing 24 and the inner shroud 26 downstream of the rotor blades 22. Each of the vanes 30 has a vane root 32 retained in the casing 24, a vane tip 34 retained in the inner shroud 26, and an airfoil portion 36 extending therebetween. The airfoil portion 36 of each vane 30 defines a relatively sharp leading edge 38 and a relatively sharp trailing edge 40, such that an airflow coming from the blades 22 and passing through the vane assembly 20 will flow over the vane airfoil 36 from the leading edge 38 to the trailing edge 40.

Throughout this description, the axial, radial and circumferential directions are defined respectively with respect to the central axis, radius and circumference of the engine 10.

Figure 3:
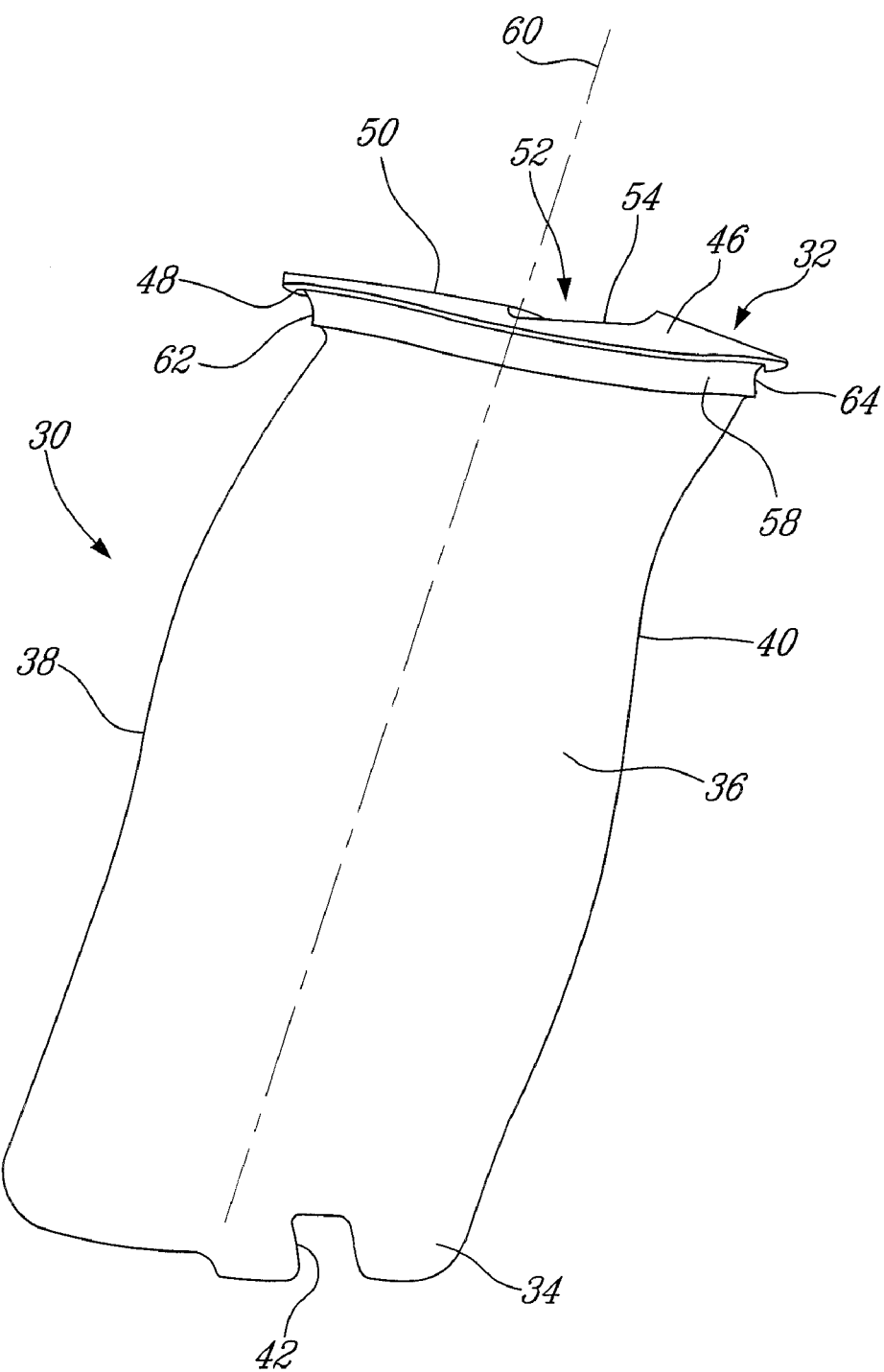
FIG. 3 is a side perspective view of a vane of the vane assembly of FIG. 2.

Referring now to FIGS. 2-3, the vane tip 34 may include a generally rectangular slot 42 extending radially into the airfoil between the leading and trailing edges 38, 40, such as to engage a corresponding web 44 of the inner shroud 26 (see FIG. 2) as disclosed in Applicant's U.S. application Ser. No. 11/223,148 filed Sep. 12, 2005, the full specification of which is incorporated herein by reference. Alternately, the vane tip 34 can have any other configuration suitable for engagement with the inner shroud 26.

Figure 7:
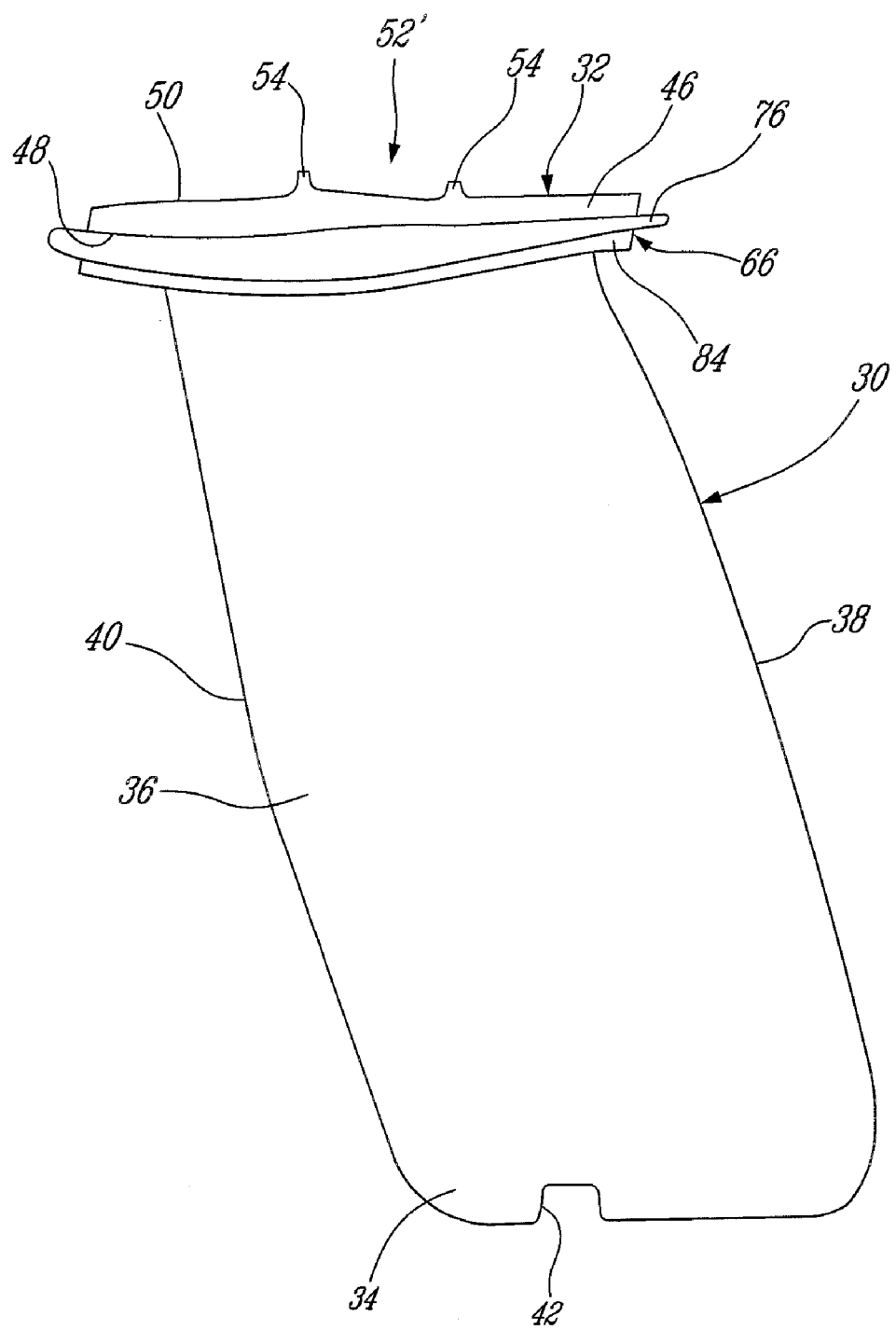
FIG. 7 is a side perspective view of an alternate vane that can be used in the vane assembly of FIG. 2.

Referring particularly to FIG. 2, the vane root 32 comprises an end platform 46 defining an inner pressure surface 48 and an opposed outer surface 50. The outer surface 50 includes a strap holder 52 which, when the vane 30 is part of the vane assembly 20, is circumferentially aligned with the strap holders 52 of the remaining vanes 30. In the particular embodiment shown in FIG. 3, the strap holder 52 is in the form of a circumferential groove 54 defined in the outer surface 50 for receiving a corresponding fastening strap 86 or other member used to fasten and retain in place the vanes 30 within the outer casing 24 of the vane assembly 20. FIG. 7 shows an alternate configuration for the strap holder 52', which includes two elongated and axially spaced apart fingers 56 extending radially outwardly from the outer surface 50. Alternate configurations for the strap holder 52, 52' can also be used.

Referring back to FIG. 3, the vane root 32 further comprises an inner recessed or button portion 58 extending inwardly from the inner pressure surface 48 of the platform 46, and connected to the airfoil portion 36. The platform 46 protrudes from the button portion 58 along at least one transverse direction of the vane 30, i.e. in a plane substantially perpendicular to the longitudinal axis 60 of the vane 30 and in a direction substantially perpendicular to the fore-aft direction of the vane blade. In a particular embodiment, the platform 46 protrudes outward from the button portion 58 around the entire perimeter thereof. The button portion 58 in turn protrudes from the airfoil portion 36 along at least one transverse direction of the vane 30, and the button portion 58 protrudes from the airfoil portion 36 around the entire perimeter thereof. Therefore, the recessed portion 58, adjacent to the platform 46 and interconnecting the airfoil portion and the platform, protrudes beyond a profile of the airfoil a distance less than the outer platform. In other words, both the inner recessed button portion 58 and the platform 46 of the root 32 protrude outwardly from the airfoil, however the platform 46 protrudes further than the inner recessed portion 58. There accordingly defines a stepped root shape about the full perimeter thereof. In the embodiment shown, the button portion 58 has a shape (i.e. a transverse profile) generally corresponding to that of the airfoil portion 36.

The inner recessed portion 58 will generally be referred to herein as the button portion. The button portion 58 includes relatively blunt leading and trailing ends 62, 64, which respectively protrude from the leading and trailing edges 38, 40 of the airfoil portion 36. The button portion 58 has a profile free of sharp edges. In use, the button portion 58 is received within an outer grommet 66 (see FIG. 7). As contact between the vane 30 and grommet 66 occurs through the vane button 58 which is free of sharp edges, the risks of tearing the grommet 66 during assembly and/or foreign object impact on the airfoils is reduced when compared, for example, to the risk of tearing a prior art grommet which usually surrounds relatively sharp leading and trailing edges of the airfoil itself.

Figure 6:
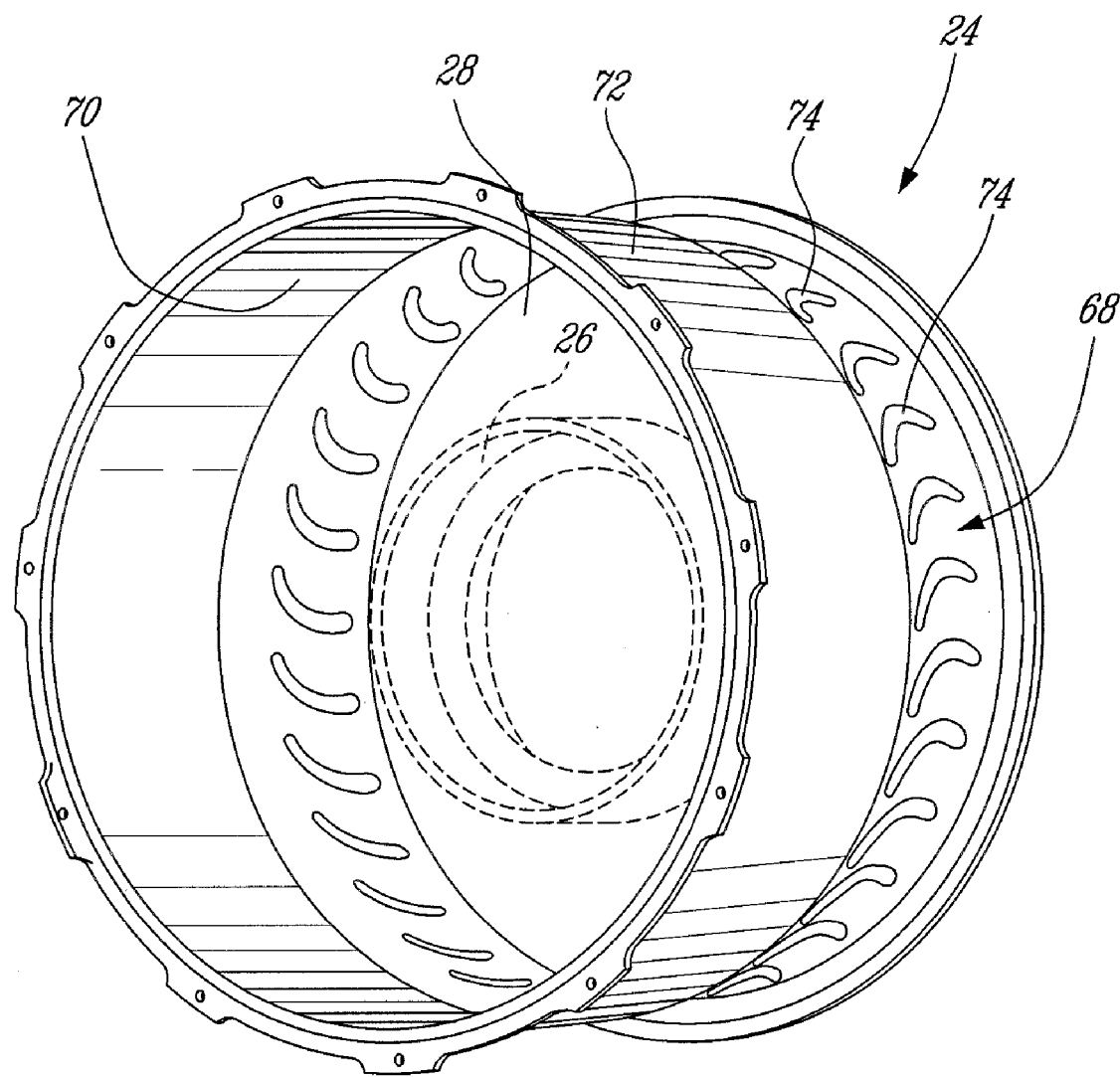
FIG. 6 is a perspective view of an outer casing forming part of the vane assembly of FIG. 2, with an inner shroud of the vane assembly being schematically shown in dotted lines.

Referring to FIG. 6, the casing 24 has a circumferential wall 68 having an inner surface 70 delimiting the flow path 28 and an outer surface 72 opposite thereto. Vane-recieving openings 74 are defined through the casing wall 68 and are regularly distributed about the circumference of the casing 24. Each opening 74 has a shape generally corresponding the shape of the button portion 58 of the vanes 30 but is enlarged relative thereto, while being configured such that the platform 46 of the corresponding vane is prevented from passing therethrough.

Figure 4:
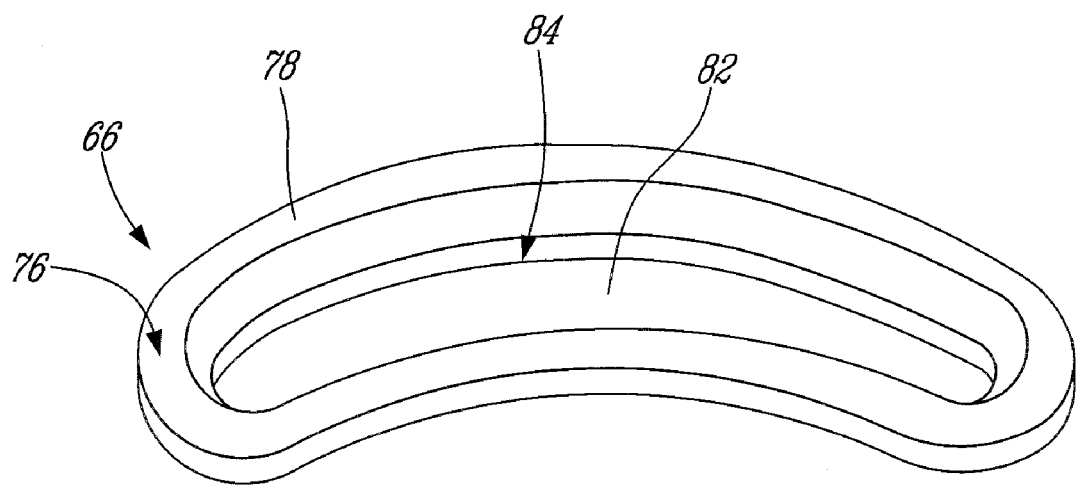
FIG. 4 is a top perspective view of an outer grommet of the vane assembly of FIG. 2.
Figure 5:
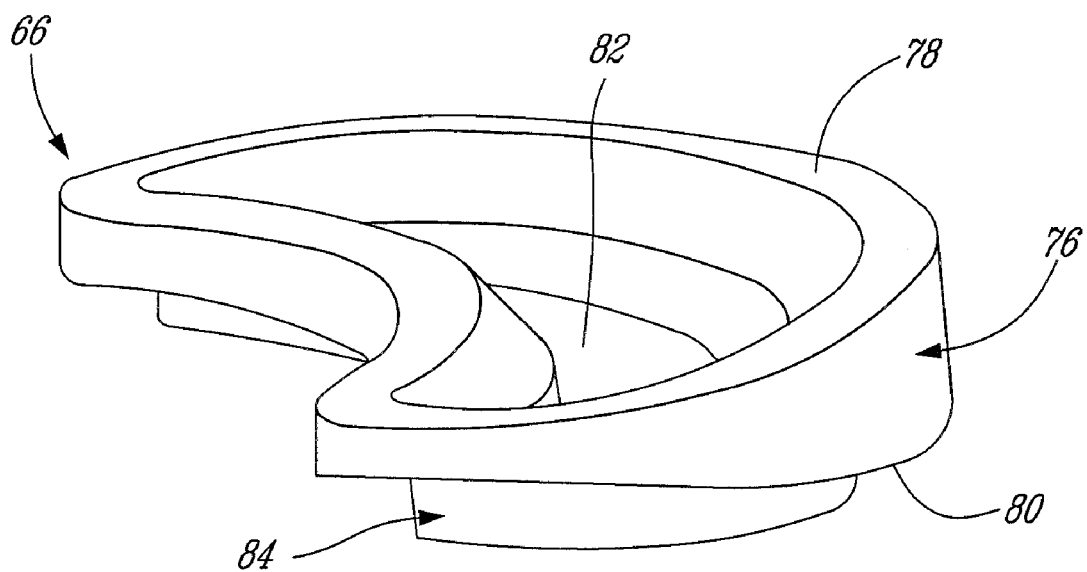
FIG. 5 is a front perspective view of the grommet of FIG. 4.

Referring to FIGS. 4-5, each outer grommet 66 has a circumferential portion 76 defining an outer surface 78 adapted to sealingly engage the inner pressure surface 48 of the platform 46 of the corresponding vane 30, and an inner surface 80 (see FIG. 5) adapted to sealingly engage the outer surface 72 of the casing wall 68 around the corresponding opening 74. The circumferential portion 76 has a slot 82 defined therein, and a lip 84 which extends radially inwardly around the slot 82. The slot 82 and lip 84 are configured to respectively sealingly receive and sealingly surround the button portion 58 of the corresponding vane 30. The lip 84 is also configured to sealingly engage the perimeter of the corresponding opening 74 in the casing wall 68 around the button portion 58. The circumferential portion 76 and lip 84 of the grommet 66 have a shape following a profile of the button portion 58, and as such of the airfoil portion 36 of the vane 30, thus minimizing the volume and weight of the grommet 66. The grommet 66 is made of a flexible, stretchable material, for example a silicon rubber, such as to be readily installed around the corresponding button portion 58. In a particular embodiment, the grommet 66 is made through an injection molding process.

Figure 8:
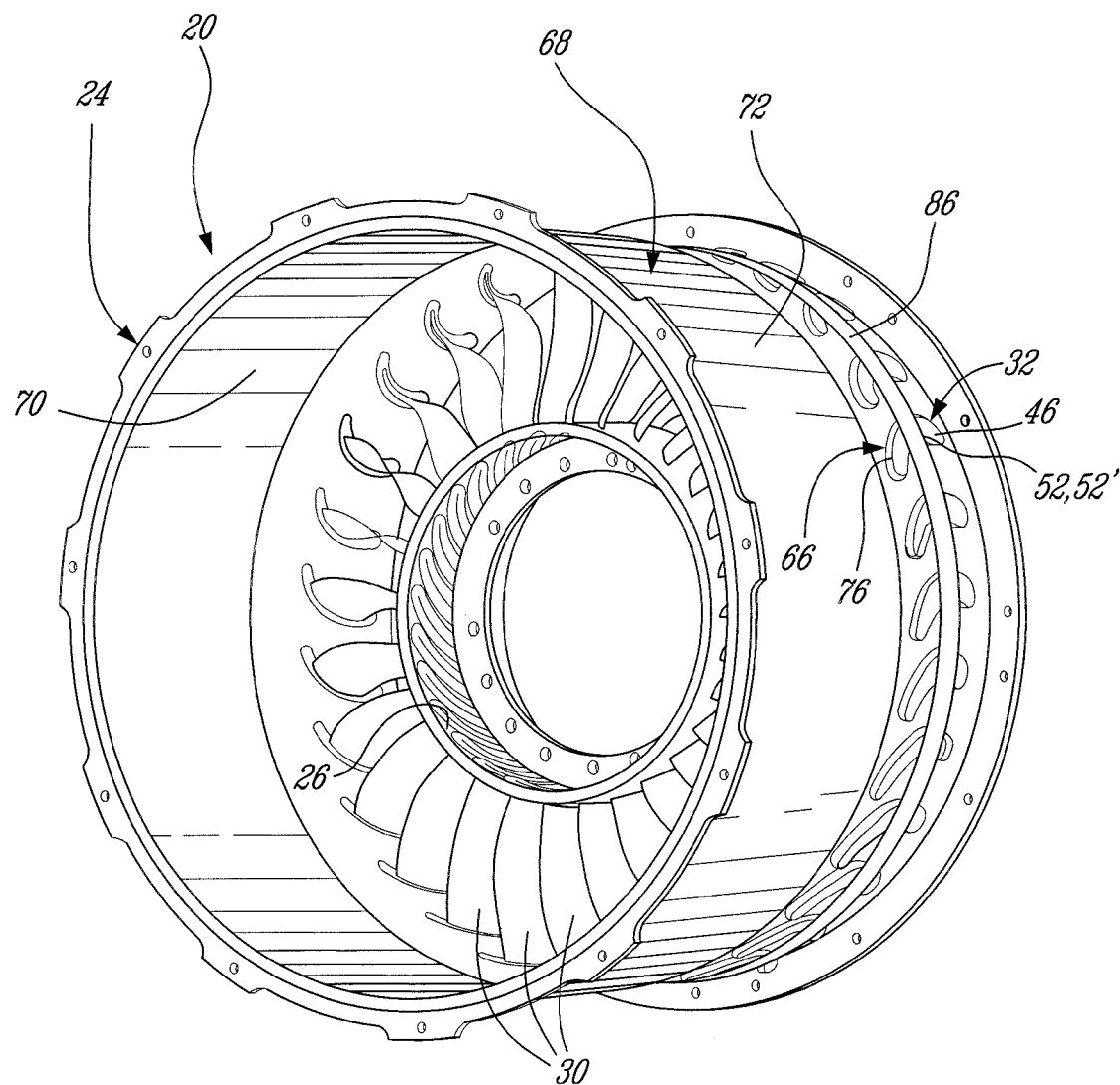
FIG. 8 is a perspective view of the vane assembly of FIG. 2.

In use, each grommet 66 is thus stretched and installed around the button portion 58 of the corresponding vane 30, with the circumferential portion 76 resting against the inner pressure surface 48 of the platform 46, as shown in FIG. 7. In a particular embodiment, the grommet 66 is stretched so that the platform 46 is passed through the grommet slot 82, and the grommet 66 is released when in place, the lip 84 surrounding the button portion 58 in a slightly stretched state to ensure a sealed engagement therewith. The vane 30 is then inserted into the casing 24 through the corresponding opening 74 in the casing wall 68, and moved radially inwardly until the vane tip 34 is engaged with the inner shroud 26 and the grommet lip 84 is engaged with the perimeter of the opening 74. As can be seen in FIG. 8, a strap 86 is then placed around the casing 24 in the aligned strap holders 52, 52' of the vane platforms 46, and the strap 86 is tightened until the circumferential portion 76 of each grommet 66 is sufficiently compressed between the inner pressure surface 48 of the corresponding platform 46 and the outer surface 72 of the casing wall 68 to seal the connection between the vanes 30 and the casing 24. Alternately, vane retaining mechanisms other than the strap can be used in order to maintain the vanes 30 in sealed engagement with the outer casing 24.

The vanes 30 of the vane assembly 20 are thus attached directly to the casing 24 without the need of an additional outer shroud. As such, damaged vanes can be replaced without the need to disassemble the entire engine 10, by simply removing the strap 86, sliding the damaged vane out of the corresponding opening 74 in the casing wall 68, sliding a new vane in place through the opening 74, and replacing the strap 86. In prior art configurations in which an additional outer shroud is used, this is not easily possible.

The blunt button portion 58 minimizes the risks of damage to the grommet 66 by the vane 30 through elimination of sharp edges in contact with the grommet 66. The enlarged button portion 58 also provides for the corresponding opening 74 in the casing wall 68 to be substantially larger than the airfoil portion 36 and tip 34 of the vane 30, facilitating the installation of the vane 30 which is done radially through the opening 74.

The vane assembly 20 eliminates the need for adhesives or potting components to retain the vane roots 32, which reduces costs and simplifies production and maintenance operations.

The absence of an outer shroud also lowers the overall weight of the engine 10. In addition, the larger openings 74 defined in the casing wall 68 lower the weight of the casing 24. The weight of the casing 24 is additionally lowered since the thickness of the casing wall 68 can be reduced with respect to a casing of the prior art used in conjunction with an outer shroud, as any loads transferred between a containment zone of the engine 10 and engine mounts in the event of foreign object damage or a fan blade failure are attenuated. Having a lighter casing 24 reduces the overall weight of the engine 10, thus improving engine performances.

The above description is meant to be exemplary only, and one skilled in the art will recognize that changes may be made to the embodiments described without department from the scope of the invention disclosed. For example, the invention can be applied to vane assemblies contained in the casing of rotor assemblies other than fans and low pressure compressors. Other modifications which fall within the scope of the present invention will be apparent to those skilled in the art, in light of a review of this disclosure, and such modifications are intended to fall within the appended claims.

What is claimed is:

1. A vane assembly comprising a vane and a grommet engaged therewith, the vane having a root, a tip and an airfoil portion extending between the root and the tip, the root including an outer platform and a recessed portion adjacent thereto and interconnecting the airfoil portion and the platform, the recessed portion protruding beyond a profile of the airfoil a distance less than the outer platform, the recessed portion of the root surrounded by the grommet lip including a button portion having leading and trailing ends free of sharp edges, the leading and trailing ends respectively protruding beyond leading and trailing edges of the airfoil portion, and the grommet having a lip sealingly surrounding said recessed portion of the root of the vane and a circumferential portion protruding around a perimeter of the lip in engagement with an inner surface of the platform, the circumferential portion having a profile corresponding to that of the airfoil portion.

2. The vane assembly as defined in claim 1, wherein the grommet is made of an elastic material.

3. The vane assembly as defined in claim 2, wherein the grommet is stretchable to allow the platform to pass within a slot defined in the circumferential portion and bordered by the lip.

4. The vane assembly as defined in claim 2, wherein the lip surrounds the recessed portion of the root of the vane in a stretched state.

5. A vane assembly for a gas turbine engine having an outer casing surrounding rotating blades of a rotor, the assembly comprising:

a tubular wall portion of the outer casing located downstream of the blades, the wall portion having a series of circumferentially and regularly spaced apart openings defined therethrough;

an inner shroud located inwardly of and concentric with the wall portion, the inner shroud and wall portion defining an annular flow path therebetween;

a vane for each of the openings radially extending between the wall portion and the inner shroud, each vane having a tip engaged to the inner shroud, a vane root having an inner recessed portion thereof located inside a corresponding one of the openings, and an airfoil portion extending between the tip and the vane root, —the inner recessed portion of the root located inside the corresponding one of the openings includes a button portion free of sharp edges and connected to the airfoil portion; and a grommet at least partially disposed within each of the openings, each grommet having a circumferential portion and a lip, the circumferential portion extending around the corresponding one of the openings outside of the outer casing and having a slot defined therethrough aligned with the corresponding one of the openings, the lip extending from the circumferential portion around the slot and surrounding the button portion, the lip forming a seal between a perimeter of the corresponding one of the openings and the inner recessed portion of the vane root located therein.

6. The vane assembly as defined in claim 5, wherein the circumferential portion of the grommet has a profile corresponding to that of the airfoil portion.

7. The vane assembly as defined in claim 5, wherein the grommet is made of an elastic material.

8. The vane assembly as defined in claim 7, wherein the grommet is stretchable such as to be able to pass the entire vane root through the slot.

9. The vane assembly as defined in claim 7, wherein the lip surrounds the inner recessed portion of the vane root located inside the opening in a stretched state.

10. The vane assembly as defined in claim 5, wherein each vane root includes a platform located outside of the outer casing and being sized greater than the openings therein, the circumferential portion of the grommet forming a seal between the outer casing and the platform around the corresponding one of the openings.

11. A rotor assembly for a gas turbine engine, the rotor assembly comprising:

rotating blades;

an outer casing surrounding the rotating blades, the outer casing having a series of circumferentially and regularly spaced apart openings defined therethrough downstream of the blades;

an inner shroud located inwardly of and concentric with the outer casing downstream of the blades, the inner shroud and outer casing defining an annular flow path therebetween;

a vane for each of the openings radially extending between the wall portion and the inner shroud, each vane having a tip engaged to the inner shroud, a vane root having an inner recessed portion thereof located inside a corresponding one of the openings, and an airfoil portion extending between the tip and the vane root, the inner recessed portion of the root located inside the corresponding one of the openings includes a button portion free of sharp edges and connected to the airfoil portion; and a grommet at least partially disposed within each of the openings, each grommet having a circumferential portion and a lip, the circumferential portion extending around the corresponding one of the openings outside of the outer casing and having a slot defined therethrough aligned with the corresponding one of the openings, the lip extending from the circumferential portion around the slot and surrounding the button portion, the lip forming a seal between a perimeter of the corresponding one of the openings and the inner recessed portion of the vane root located therein.

12. The rotor assembly as defined in claim 11, wherein the circumferential portion of the grommet has a profile corresponding to that of the airfoil portion.

13. The rotor assembly as defined in claim 11, wherein the grommet is made of an elastic material.

14. The rotor assembly as defined in claim 11, wherein the grommet is stretchable such as to be able to pass the entire vane root through the slot.

15. The rotor assembly as defined in claim 11, wherein the lip surrounds the inner recessed portion of the vane root located inside the opening in a stretched state.

16. The rotor assembly as defined in claim 11, wherein each vane root includes a platform located outside of the outer casing and being sized greater than the openings therein, the circumferential portion of the grommet forming a seal between the outer casing and the platform around the corresponding one of the openings.

* * * * *